United States Patent [19]

Okada et al.

[11] Patent Number: 5,686,921
[45] Date of Patent: Nov. 11, 1997

[54] RADAR SYSTEM

[75] Inventors: Yasushi Okada; Katsuhiko Takebe; Hiroyuki Ando, all of Wako, Japan

[73] Assignee: Honda Giken Kogyo Kabushiki Kaisha, Tokyo, Japan

[21] Appl. No.: 575,337

[22] Filed: Dec. 20, 1995

[30] Foreign Application Priority Data

Dec. 20, 1994 [JP] Japan ................ 6-316821

[51] Int. Cl.$^6$ ................................. G01S 13/10
[52] U.S. Cl. ............................. 342/127; 342/134
[58] Field of Search ............................ 342/118, 127, 342/128, 131, 132, 134

[56] References Cited

U.S. PATENT DOCUMENTS 5,087,918  2/1992  May et al. ................... 342/70

FOREIGN PATENT DOCUMENTS 57-142575
(A)  9/1982  Japan.
57-166573
(A)  10/1982  Japan.

*Primary Examiner*—Daniel T. Pihulic
*Attorney, Agent, or Firm*—Lyon & Lyon LLP

[57] ABSTRACT

A radar system is designed to allow switched use of a pulse radar mode for detecting a target at a long distance away and a phase-difference radar mode for detecting a target at a short distance away, whereby target detection can be performed from a very close range to a long range with high accuracy. Also, the pulse radar mode enables detection of a plurality of targets in different ranges.

11 Claims, 8 Drawing Sheets

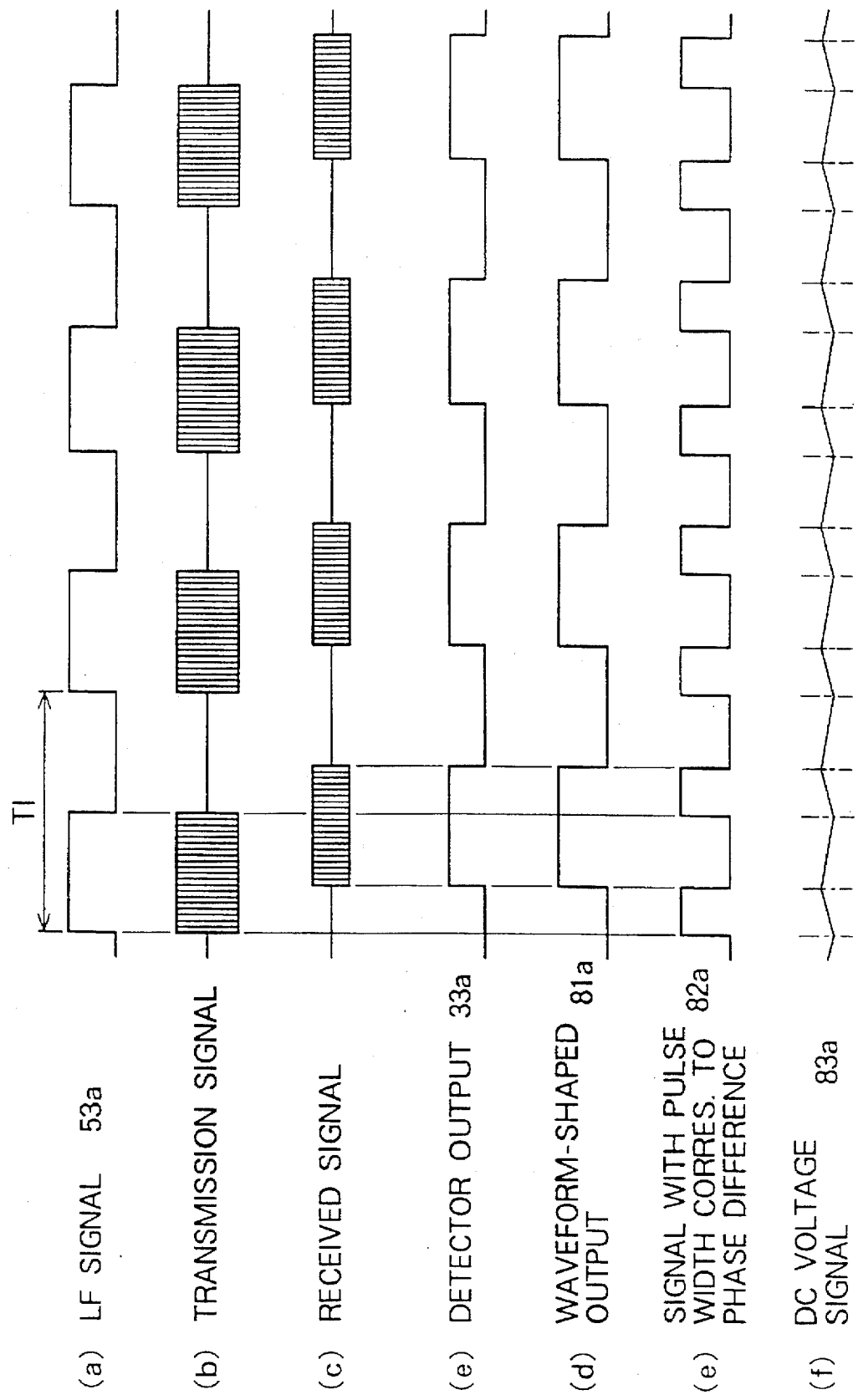

RADAR SYSTEM

BACKGROUND OF THE INVENTION

1. Field of the Invention:

The present invention relates to a radar system designed to detect a target at an extremely short to long distance away by switched use of a pulse (frequency modulated-continuous wave) radar mode and a phase-difference radar mode.

2. Description of the Related Art:

Pulse radar systems are well known. Such a system is designed to transmit a high frequency carrier in a pulse modulated state, receive reflected waves from the target, and find a range to a target away on the basis of the time difference from transmission to reception of each pulse. These pulse radar systems have an advantage in that they are capable of detecting a plurality of targets in different ranges.

Japanese Patent Laid-Open Publication Nos. SHO 57-142575 and SHO 57-166573 show a microwave telerometer for measuring a range to a target on the basis of the phase difference between a low frequency transmission signal and a received low frequency signal obtained by amplitude-modulating the low frequency transmission signal with a microwave, transmitting the AM'd transmission signal, receiving and amplifying the AM'd transmission signal reflected by a target, and AM-detecting the low frequency transmission signal in the amplified, received signal.

However, in such a pulse radar system, if the range to the target is short, a reflected wave may come back during the duration of the transmission, causing the reflected wave to become difficult to be sensed, resulting in inability of short range detection. On the other hand, in an AM radar system, long range detection is difficult, because the measurable range is limited by the wavelength of a low frequency signal used for the modulation.

SUMMARY OF THE INVENTION

It is therefore an object of the invention is to provide a radar system capable of detecting a target at a very close to long range away.

A radar system according to the present invention comprises means operative in a pulse radar mode for transmitting a high frequency signal as pulses in which their durations are shorter than their periods and detecting the range to the target on the basis of the time difference from the transmission to the reception of the pulse, means operative in a phase-difference radar mode for transmitting a high-frequency signal, modulated with a low frequency signal, and detecting the range to the target on the basis of the phase difference between the transmitted high-frequency signal and a received low-frequency signal detected in the transmitted high-frequency signal reflected by the target, and means for allowing switched use of the pulse radar mode and the phase-difference radar mode.

Since the pulse radar mode and the phase-difference radar mode can be switched from one to the other, the radar system can detect a target in a very close range to a long range by performing a long range detection using the pulse radar mode and by performing a short range detection using the phase-difference radar mode. Also, the pulse radar mode enables detection of a plurality of targets in different ranges.

BRIEF DESCRIPTION OF THE DRAWINGS

Preferred embodiments of the present invention will now be described in detail, by way of example only, with reference to the accompanying drawings, in which:

FIG. 8 is a timing chart showing operation of the phase difference detector.

DETAILED DESCRIPTION OF THE PREFERRED EMBODIMENTS

Figure 1:
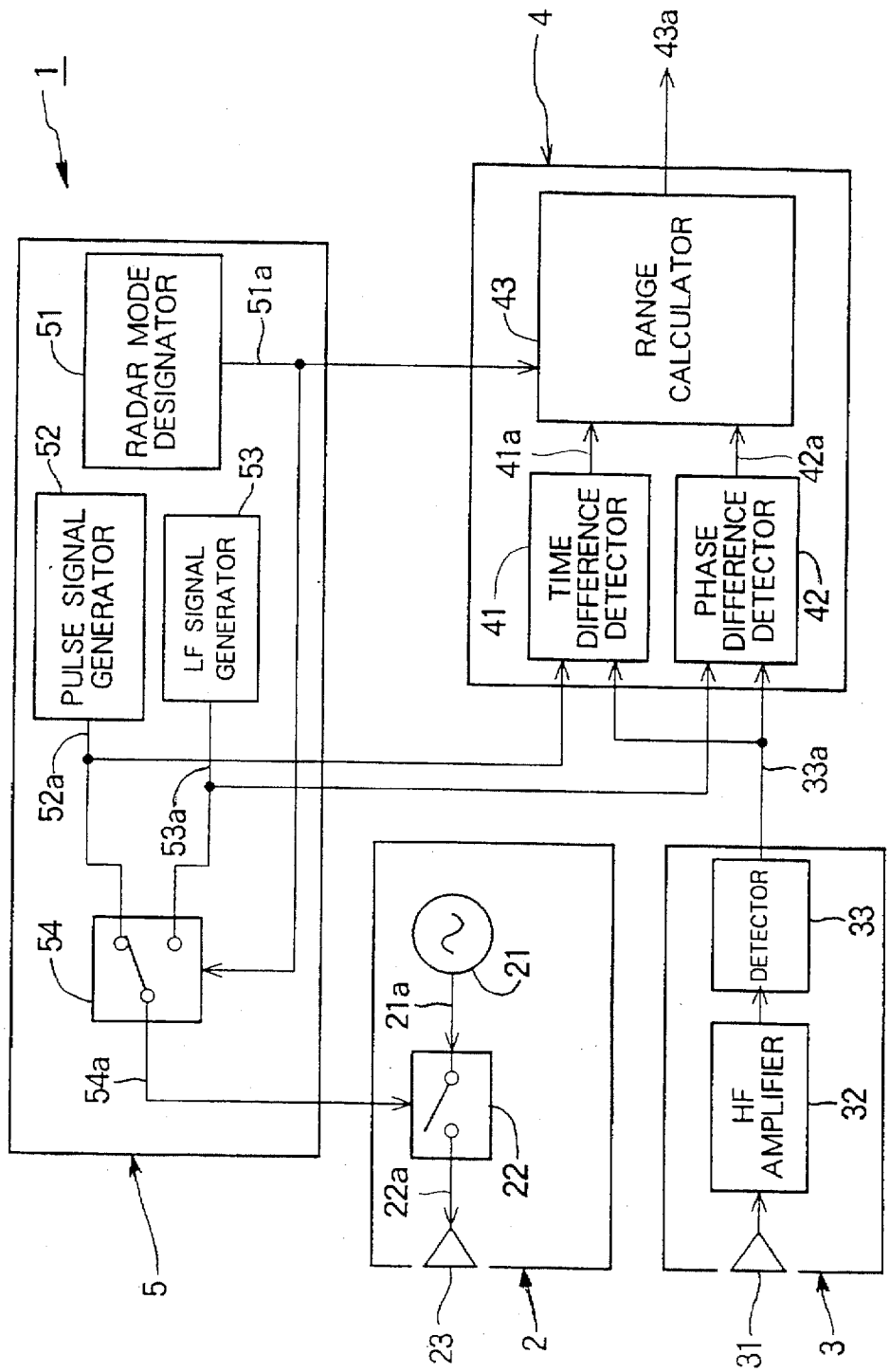
FIG. 1 is a block diagram of a radar system according to the present invention.

Referring to the drawings, the embodiments of the present invention will now be discussed in detail.

Figure 2:
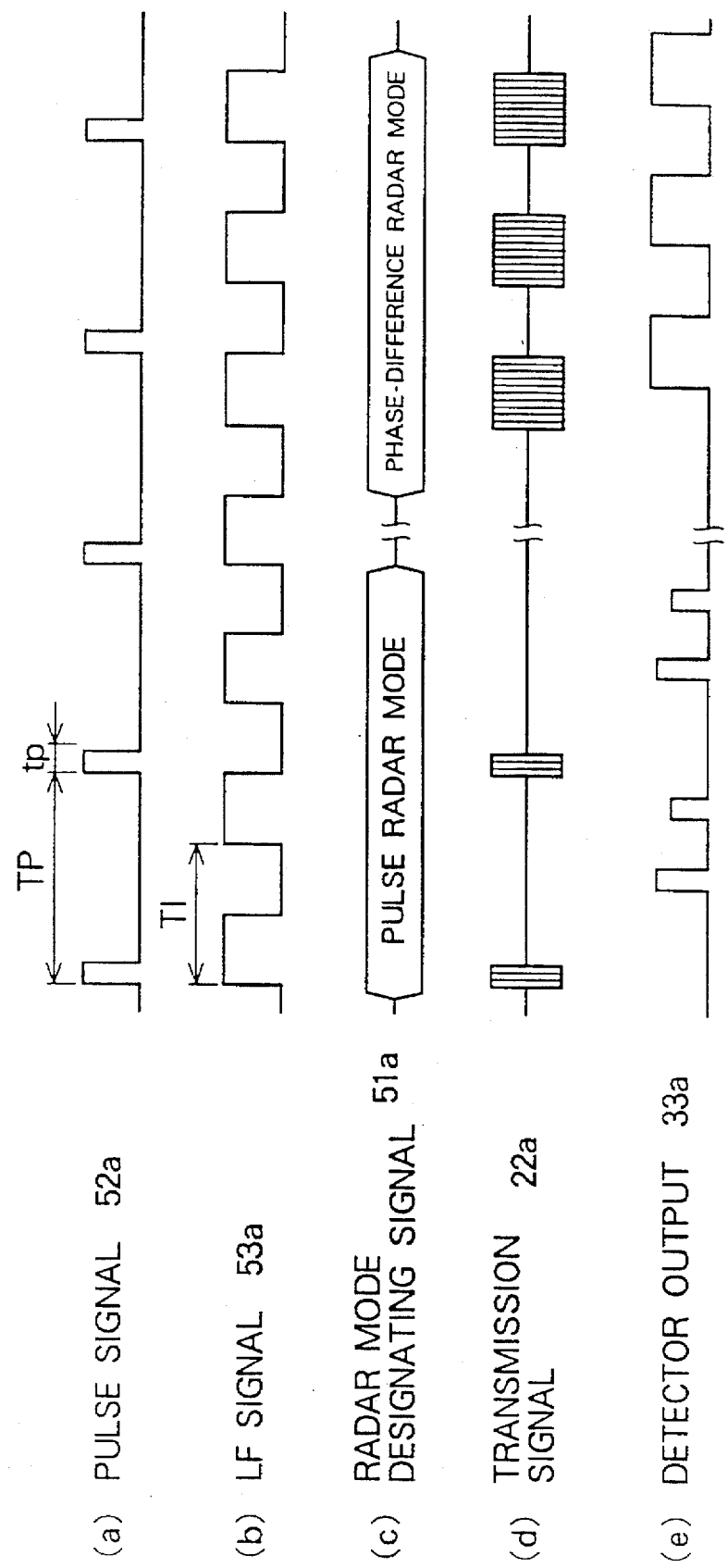
FIG. 2 is a timing chart illustrating radar mode switching operation of the radar system according to the invention.

Initial reference is taken to FIG. 1 in which a radar system according to the present invention is shown in block diagram and to FIG. 2 in which a timing chart of radar mode switching operation in the radar system is shown. The radar system 1 comprises a transmitter 2, a receiver 3, a signal processor 4 and a radar mode control 5, as shown in FIG. 1.

The transmitter 2 comprises a high-frequency signal oscillator 21 for generating a high frequency (HF) signal in a millimetric wave band, a switching device 22 and a transmitting antenna 24. The receiver 3 comprises a receiving antenna 31, a high-frequency amplifier 32 and a detector The signal processor 4 comprises a time difference detector 41, a phase difference detector 42 and a range calculator The radar mode control 5 comprises a radar mode designator 51, a pulse signal generator 52, a low-frequency (LF) signal generator 53, and a modulating signal selector 54.

The pulse signal generator 52 outputs a pulse signal 52a with a pulse repeat period TP and pulse width (duration) tp as shown in FIG. 2 (a). The pulse width tp is designed to be sufficiently shorter than the pulse repeat period TP. The LF signal generator 53 outputs an LF signal 53a comprised of rectangular waves with the period TI as shown in FIG. 2 (b). The radar mode designator 51 outputs a radar mode designating signal 51a for alternately designating the pulse radar mode and the phase-difference radar mode in respective time slots as shown in FIG. 2 (c).

The modulating signal selector 54 selectively supplies the pulse signal 52a or the LF signal 53a as a modulating signal 54a to the switching device 22 based on whether the radar mode signal 51a is the pulse or phase-difference radar mode. Thus, in the pulse radar mode, the pulse-modulated signal 22a obtained by pulse modulating the millimetric-waveband HF signal 21a is radiated as electromagnetic waves from the transmitting antenna 23, and in the phase-difference radar mode, the signal 22a obtained by intermittently modulating the HF signal 21a with the LF signal 53a is radiated as electromagnetic waves, as shown in FIG. 2 (d).

It should be noted that in the phase-difference radar mode, the HF signal 21a may be so modulated as to binarize the magnitude of the HF signal on the basis of the LF signal 53a. Alternatively, the LF signal generator 53 may be formed of an LF sine signal Generator for Generating a sine signal to amplitude modulate the HF signal on the basis of the sine signal for radiating as electromagnetic waves. However, this method requires an amplitude modulator. On the other hand, as shown in FIG. 1, intermittent modulation of the HF signal 21a by means of the switching device eliminates the need of the amplitude modulator, which further simplifies the structure of the transmitter 2, because the switching device 22 can be commonly used in both the pulse and phase-difference radar mode.

The electromagnetic waves radiated from the transmitting antenna 23 is reflected by an object such as a target, the reflected electromagnetic waves are received by the receiving antenna 31, amplified in the HF amplifier 32, demodulated in the detector 33. An example of the detector output 33a is shown in FIG. 2 (e).

The time difference detector 41 is so arranged as to detect the time difference between the pulse signal 52a and the detector output 33a and output time difference data 41a. The phase difference detector 42 is so arranged as to detect the phase difference between the LF signal 53a and the detector output 33a and output phase difference data 42a. The range calculator 43 calculates a range to a target from the time difference data 41a in case of the pulse radar mode of the radar mode designating signal 51a and from the phase-difference data 42a in case of the phase-difference radar mode of the radar mode designating signal 51a, and outputs range data 43a.

In this way, the pulse radar mode and the phase-difference radar mode can be switched from one to the other, so that the radar system can detect a target in a very close range to a long range by performing a long range detection using the pulse radar mode and by performing a short range detection using the phase-difference radar mode. Also, the pulse radar mode enables a plurality of targets in different ranges to be identified. Accordingly, a vehicle mounting the radar system 1 can detect, for example, another vehicle a few meters to tens of meters ahead using the pulse radar mode, and, in case of a right or left turn, or garaging, can detect how many centimeters there are left to an obstacle using the phase-difference radar mode.

The time difference detector 41 is designed to convert the detector output 33a into a digital signal by means of an A/D converter and detect received pulses and time differences by data processing. If, for example, a target more than one and half meter away is to be detected, the pulse width tp will be as short as 10 ns, and the sampling frequency of an ordinary A/D converter is insufficient for the detection. Thus, the detector is designed to obtain the digital signals of the received pulses from a plurality of transmitted pulses taken while shifting the sampling timing by predetermined time every time a pulse is transmitted.

Figure 3:
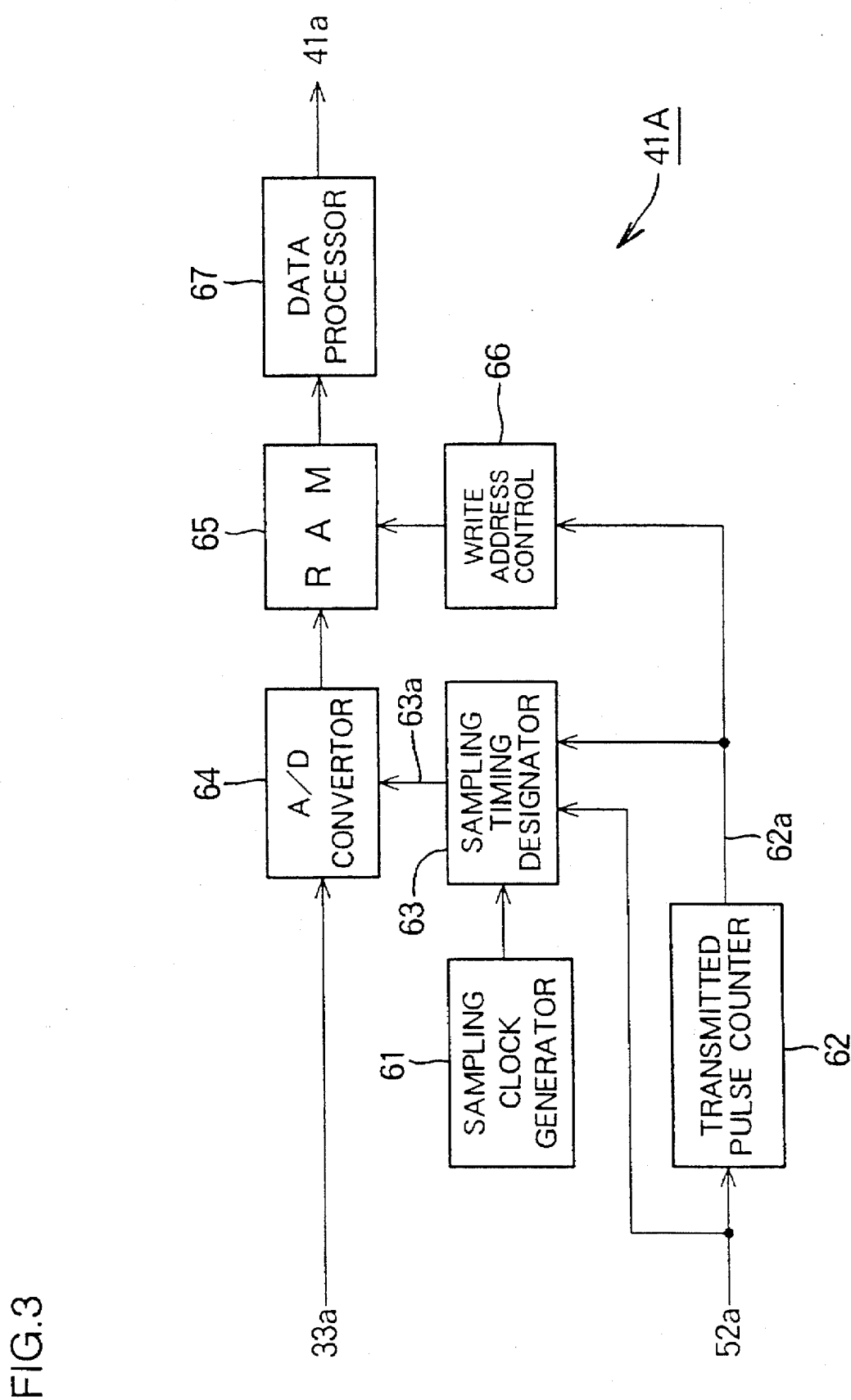
FIG. 3 is a block diagram of a time difference detector with an extended sampling cycle.
Figure 4:
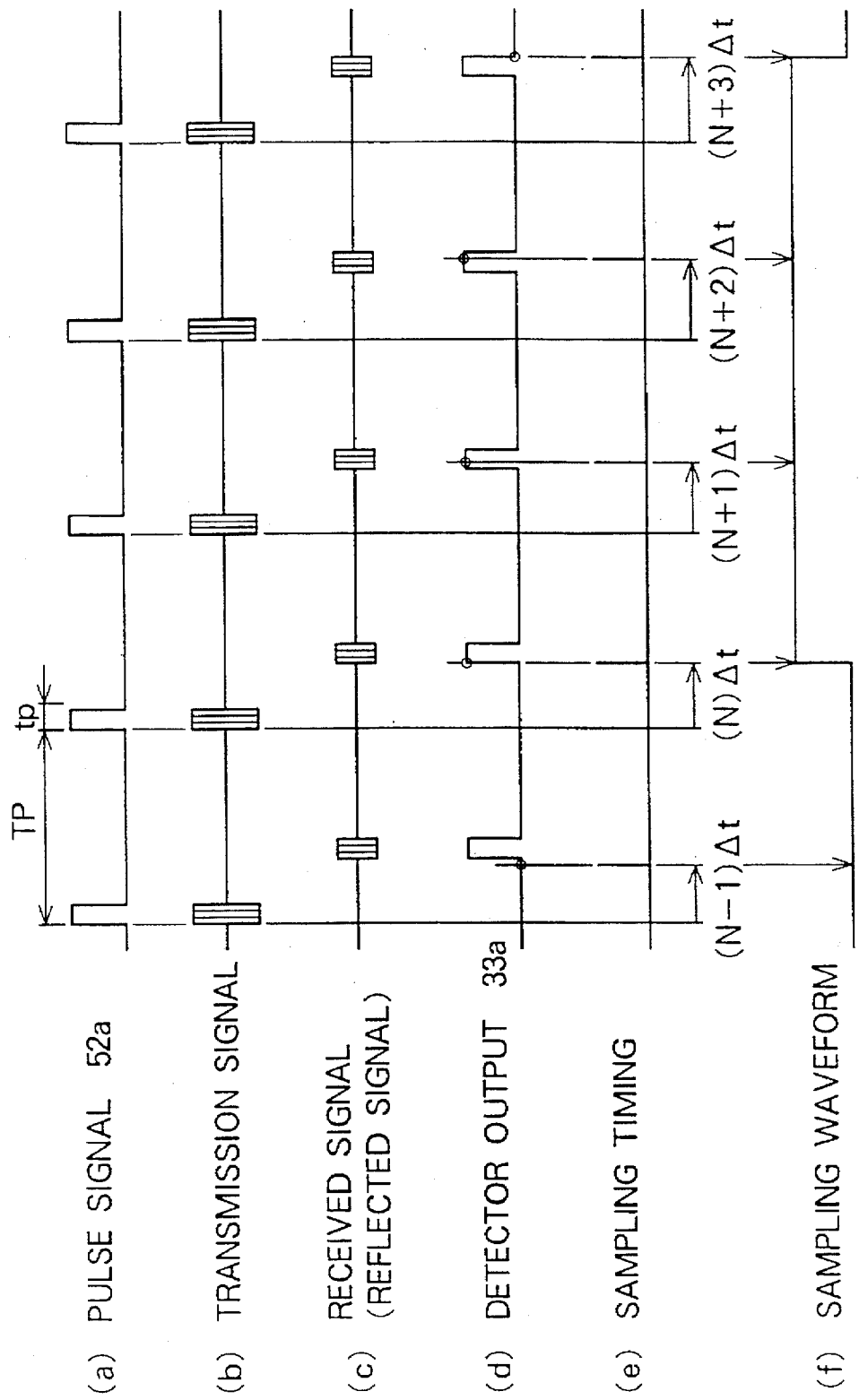
FIG. 4 is a timing chart showing operation in extending the sampling period.

FIG. 3 is a block diagram of the time difference detector 41 with an extended sampling cycle, and FIG. 4 is a timing chart illustrating operation of the detector 41. A sampling clock generator 61 generates a clock of a sampling frequency. A transmitted pulse counter 62 counts the number of pulses of the pulse signal 52a transmitted in a predetermined cycle TP and supplies the count output 62a to a sampling timing designator 63. The sampling timing designator 63 supplies a sampling clock as a sampling timing signal 63a to the sampling timing designator input terminal 64a of the A/D converter 64 when the time corresponding to the count of the transmitted pulses has passed from a rising or falling edge of the pulse signal 52a.

By making such arrangements as described above, the sampling timing of the received signal (detector output) can be shifted by Δt (one sampling cycle) in each cycle of pulse transmission as shown in FIG. 4 (d). That is, it is possible to obtain a sampling Waveform which has been extended with respect to time by shifting the sampling point (designated by a small circle) of the detector output 33a during each pulse transmission cycle as shown in FIG. 4 (f). Writing A/D converted data sequentially in RAM 65 will result in a series of A/D converted data for a received signal. In this case, a write address control 66 specifies the write addresses to the RAM 65. A data processor 67 detects a received pulse from the received data stored in the RAM 65 and outputs time difference data.

Although the time difference detector 41A shown in FIG. 3 is arranged to obtain one unit of A/D converted data in each pulse transmission cycle, an alternative arrangement may be employed in which A/D converted data for a plurality of points in one transmission pulse cycle is obtained by generating samples with a time difference of ΔtxN at times of the transmitted pulse count +N, +2N, +3N and so on, where N is an integer. If desired, a plurality of A/D converters may be provided which are arranged to be sequentially activated one in each sampling cycle in a shifted way. By A/D converting the a plurality of points in one pulse transmission cycle, it becomes possible to shorten the time required for obtaining a series of received data. Further, provision of a plurality of A/D converters enables a series of received data to be obtained in one pulse transmission cycle.

Figure 5:
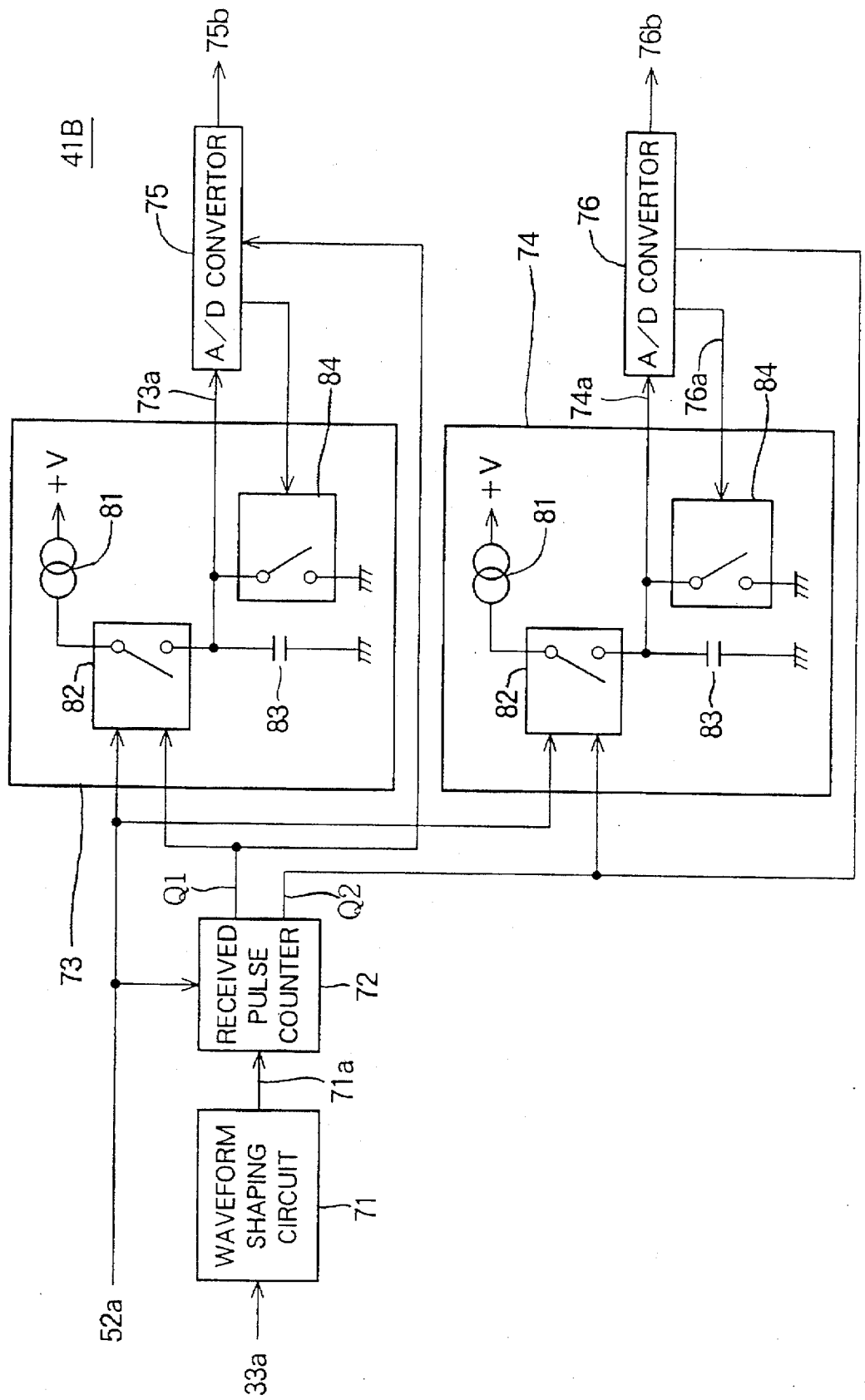
FIG. 5 is a block diagram of a time difference detector provided with a time difference-to-voltage converter.
Figure 6:
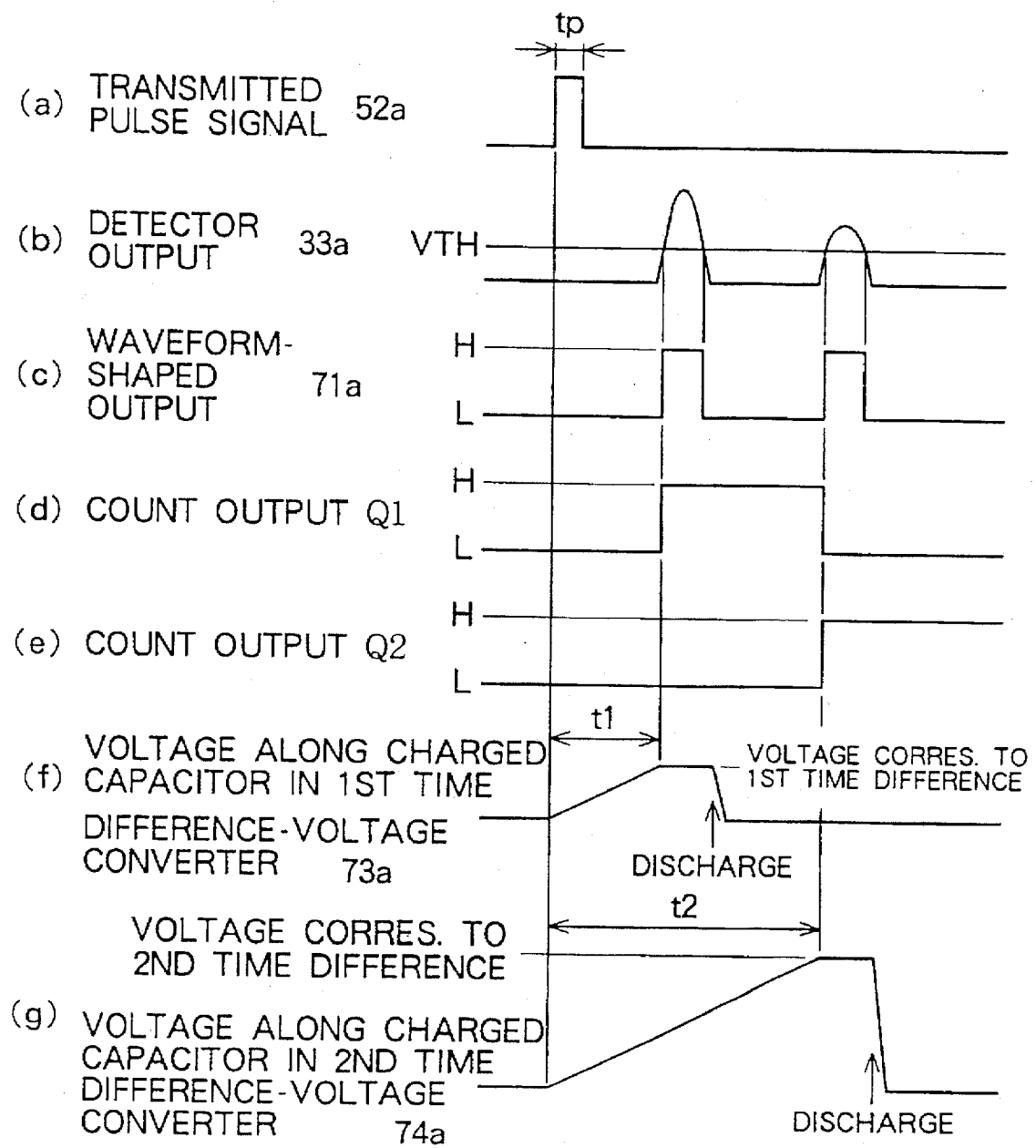
FIG. 6 is a timing chart showing operation of the time difference detector provided with the time difference-to-voltage converter.

Reference is now taken to FIG. 5 in which the time difference detector having a time-difference-to-voltage converter is shown in block diagram, and to FIG. 6 which is a time chart illustrating operation of the detector. The time difference detector 41B comprises a waveform-shaping circuit 71, a received pulse counter 72, a first and second time-difference-to-voltage converters 73 and 74, and a first and second A/D converters 75 and 76.

Assume that a pulse shown in FIG. 6 (a) is transmitted and a detector output 33a as shown in FIG. 6 (b), is obtained. Shown in FIG. 6 (b), is a case where reflected waves are received from two targets in different ranges. The waveform-shaping circuit 71 shapes the waveforms of the detector outputs 33a exceeding a preset threshold value VTH, and outputs a received pulse signal 71a shown in FIG. 6 (c). A received pulse counter 72 counts the received pulses 71a on the basis of the rise of the received pulse signal 71a output from the waveform-shaping circuit 71 after having been reset at a rise time of the transmitted pulse signal 52a. The received pulse counter 72 outputs the first count output Q1 when it counts the first received pulse and outputs the second count output Q2 when it counts the second received pulse, as shown in FIG. 6 (d) and (e).

Each of the time-difference-to-voltage converters 73 and 74 comprises a constant current source 81, a charge control 82, a capacitor 83 and a discharge circuit 84. Discussion will be made hereinbelow as to the arrangement and operation of the first time-difference-to-voltage converter and the first A/D converter 75. A charge control circuit 82, on detecting a rising edge of the pulse signal 52a, starts charging the capacitor 83, and stops charging when the count output Q1 is supplied. An A/D converter 75 samples and holds the voltage along the charged capacitor 83 at the time of rising of the count output Q1. When the A/D converter 75 completes an A/D conversion operation, it outputs a conversion end signal 75a. On detecting the conversion end signal 75a, the discharge circuit 84 causes the capacitor 83 to discharge electric charges.

Thus, the first time-difference-to-voltage converter 73 outputs a voltage signal 73a relative to the time t1 from the transmission of a pulse to the detection of the first reflected signal as shown in FIG. 6 (f). The voltage signal 73a is A/D converted by the first A/D converter 75 into digital data 75b relative to the time difference for the first target. Similarly, the second time-difference-to-voltage converter 74 outputs a voltage signal 74a relative to the time t2 from the transmission of the pulse to the detection of the second reflected signal as shown in FIG. 6 (g). The voltage signal 74a is A/D converted by the second A/D converter 76 into digital data 76b relative to the time difference for the second target. It should be noted that three or more time-difference-to-voltage converters may be provided so that three or more targets can be detected.

If the time difference between the transmitted and the received signal is found through the A/D conversion of received signal and the subsequent digital signal processing, a high-speed A/D converter is necessary. However, digital data relative to the distance (time difference) can be obtained with a conventional A/D converter by generating a voltage corresponding to the time difference between the transmitted and received signals and detecting the range to the target on the basis of the voltage.

Figure 7:
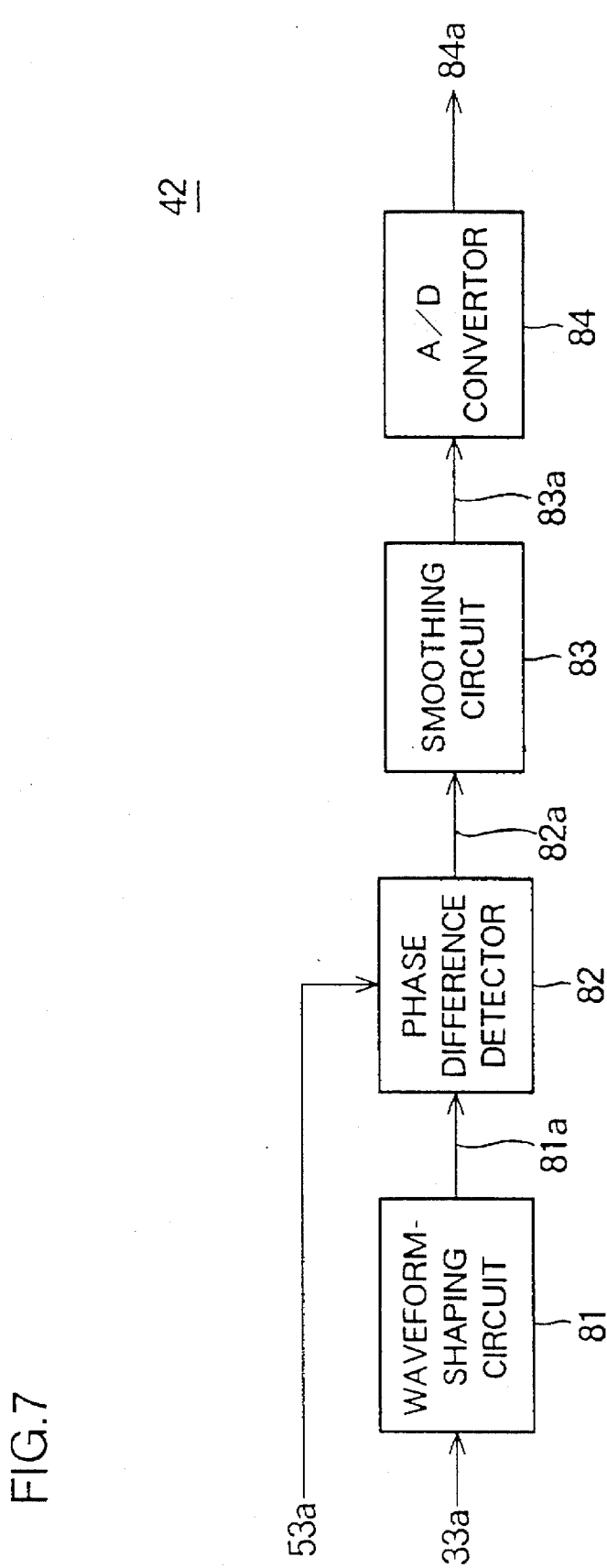
FIG. 7 is a block diagram showing a concrete example of a phase difference detector.

Reference is now taken to FIG. 7 which shows, in block diagram, an illustrative embodiment of a phase difference detector of the present invention, and to FIG. 8 which is a time chart showing operation in detecting the phase difference. The phase difference detector 42 comprises a waveform-shaping circuit 81 for generating a waveform-shaped output 81a obtained by shaping and binarizing the waveform of the detector output 33a, a phase difference detecting circuit 82 for detecting the phase difference between the LF signal 52a equivalent to the transmitted signal and the waveform-shaped output 81a and outputs a signal 82a the pulse width of which is responsive to the phase difference, a smoothing circuit 83 for smoothing the signal 82a with a pulse width responsive to the phase difference and output a DC voltage signal, and an A/D converter 84 for A/D converting the smoothed output 83a to output data 84a relative to the phase difference.

The phase difference detecting circuit 82 is formed of, e.g., an exclusive OR circuit, and outputs a signal 82a with the pulse width corresponding to the phase difference as shown in FIG. 8 (e). The signal 82a is smoothed by the smoothing circuit 83 to obtain a DC voltage signal 83a as shown in FIG. 8 (f). It is noted that FIG. 8 (f), shows a situation where smoothing by means of a smoothing circuit 83 having a relatively long charging time constant yields a pulsating voltage signal while an integration circuit with a short charging time constant and a long discharging time constant may be used to integrate the signal 82a pulses within a predetermined period of time or the signal 82a pulses corresponding to a predetermined number of LF modulating signal 53a pulses, and then the integrated output voltage may be analog-to-digital converted.

If an exclusive OR circuit is used for the phase difference detecting circuit 82, the smoothed output advantageously contains fewer pulsating components, because the output signal 82a of the phase difference detecting circuit 82 comprises two different kinds of pulses, namely, one corresponding to the phase difference between the rising edges of a modulating signal 53a (transmitted signal) pulse and the corresponding waveform-shaped output 61a (received signal) pulse and the other corresponding to the phase difference between the falling edges of them. When a plurality of targets exist in different ranges, the duration of a waveform-shaped output 81a (or detector output 33a) pulse may become longer than that of the corresponding modulating signal 53a pulse, because the time difference corresponding to the distance between the relevant targets has been added to the time of receipt of the falling edge of the received signal pulse. In such a case, the above described phase difference between the rising edges and that between the falling edges are different, that is, the latter is larger than the former, resulting in the measured range being longer than the actual distance with respect to the target at a shortest distance. For this reason, the phase difference detecting circuit 82 may be arranged such that it outputs a signal comprising pulses each corresponding to the time period from the rising edge of the transmission signal to that of the received signal.

As described above, since the pulse radar mode and the phase-difference radar mode can be switched to each other, the radar system can detect a target in a very close range to a long range by performing a long range detection using the pulse radar mode and by performing a short range detection using the phase-difference radar mode. Also, the pulse radar mode enables a plurality of targets in different ranges to be identified.

What is claimed is:

1. A radar system for transmitting a high-frequency signal, receiving a signal reflected by a target and detecting a range to the target based on the time difference between the transmitted signal and received signal, said radar system comprising:

a pulse radar mode for transmitting a high-frequency signal as a pulse of narrow width with respect to a repeated transmission cycle and detecting said range to said target based on the time difference between transmission and reception of said pulse;

a phase-difference radar mode for transmitting a signal, obtained by modulating a high frequency signal with a low-frequency signal, and detecting said range to said target based on the phase difference between a low-frequency signal, obtained by detecting a received signal reflected by said target, and said transmitted low-frequency signal; and switching means for allowing switched use of said pulse radar mode and said phase-difference radar mode.

2. A radar system according to claim 1, further comprising:

a transmitting antenna;

a high-frequency oscillator for generating a high-frequency signal in a millimetric-wave band; and a switching device disposed between said high-frequency oscillator and said antenna and being capable of switching operation for allowing transmission of said narrow-width pulse and said high-frequency signal intermittently modulated with said low-frequency signal.

3. A radar system according to claim 1, further comprising a shifter for operating in said pulse radar mode to sequentially shift the sampling timing for A/D converting said received pulse every time pulse transmission is repeated, so as to obtain time-base-extended received pulse data.

4. A radar system according to claim 1, further comprising a time-difference-to-voltage converter for operating in said pulse radar mode to generate a voltage, corresponding to said time difference between said transmitted and received pulses, to be A/D converted to obtain data relative to said time difference.

5. A radar system according to claim 1, wherein a plurality of targets in different ranges are detected by said pulse radar mode.

6. A radar system according to claim 1, further comprising:

a phase difference detector for operating in said phase-difference radar mode to detect said phase difference between said low-frequency signal, used for modulating said high-frequency signal, and a waveform-shaped version of said received signal and output a pulse signal relative to said phase difference;

a smoothing circuit for operating in said phase-difference radar mode to smooth said pulse signal output from said phase difference detector and provide a DC signal; and an A/D converter for operating in said phase-difference radar mode to A/D convert said DC signal to thereby obtain data relative to said phase difference.

7. A radar system according to claim 1, further comprising:

a phase difference detector for operating in said phase difference radar mode to detect said phase difference between said low-frequency signal used for modulating said high-frequency signal and a waveform-shaped version of said received signal to thereby provide a pulse signal relative to said phase difference;

an integration circuit for operating in said phase difference radar mode to integrate said pulse signal output from said integration circuit for predetermined time or a number of times of intermittent transmission to thereby provide an integrated output voltage; and an A/D converter for operating in said phase difference radar mode to A/D convert said output voltage to thereby obtain data relative to said phase difference.

8. A radar system according to claim 6 or 7, wherein said phase difference detector comprises an exclusive OR circuit.

9. A radar system for transmitting a high-frequency signal, receiving a signal reflected by a target and detecting a range to the target based on the time difference between the transmitted signal and received signal, said radar system comprising:

a pulse radar mode for transmitting a high-frequency signal as a pulse of narrow width with respect to a repeated transmission cycle and detecting said range to said target based on the time difference between transmission and reception of said pulse;

a phase-difference radar mode for transmitting a signal, obtained by modulating a high-frequency signal with a low-frequency signal, and detecting said range to said target based on the phase difference between a low-frequency signal, obtained by detecting a received signal reflected by said target, and said transmitted low-frequency signal;

switching means for allowing switched use of said pulse radar mode and said phase-difference radar mode;

a transmitting antenna;

a high-frequency oscillator for generating a high-frequency signal in a millimetric-wave band;

a switching device disposed between said high-frequency oscillator and said antenna and being capable of switching operation for allowing transmission of said narrow-width pulse and said high-frequency signal intermittently modulated with said low-frequency signal; and a shifter for operating in said pulse radar mode to sequentially shift the sampling timing for A/D converting said received pulse every time pulse transmission is repeated, so as to obtain time-base-extended received pulse data.

10. A radar system for transmitting a high-frequency signal, receiving a signal reflected by a target and detecting a range to the target based on the time difference between the transmitted signal and received signal, said radar system comprising:

a pulse radar mode for transmitting a high-frequency signal as a pulse of narrow width with respect to a repeated transmission cycle and detecting said range to said target based on the time difference between transmission and reception of said pulse;

a phase-difference radar mode for transmitting a signal, obtained by modulating a high-frequency signal with a low-frequency signal, and detecting said range to said target based on the phase difference between a low-frequency signal, obtained by detecting a received signal reflected by said target, and said transmitted low-frequency signal;

switching means for allowing switched use of said pulse radar mode and said phase-difference radar mode;

a transmitting antenna;

a high-frequency oscillator for generating a high-frequency signal in a millimetric-wave band;

a switching device disposed between said high-frequency oscillator and said antenna and being capable of switching operation for allowing transmission of said narrow-width pulse and said high-frequency signal intermittently modulated with said low-frequency signal; and a time-difference-to-voltage converter adapted to operate in said pulse radar mode to generate a voltage, corresponding to said time difference between said transmitted and received pulses, to be A/D converted to obtain data relative to said time difference.

11. A radar system according to claim 10, wherein a plurality of targets in different ranges are detected by said pulse radar mode.

* * * * *